June 7, 1966 A. SHTASEL 3,254,390
METHOD OF MAKING SOLID CAPACITOR
Filed April 3, 1961
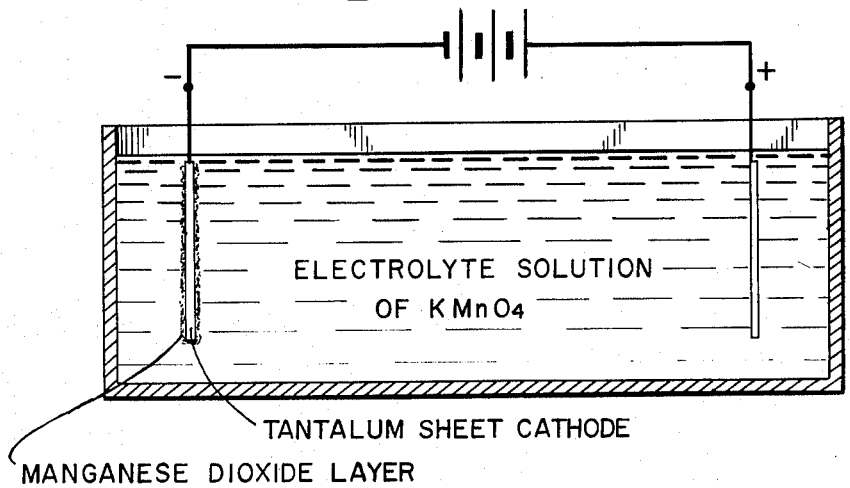
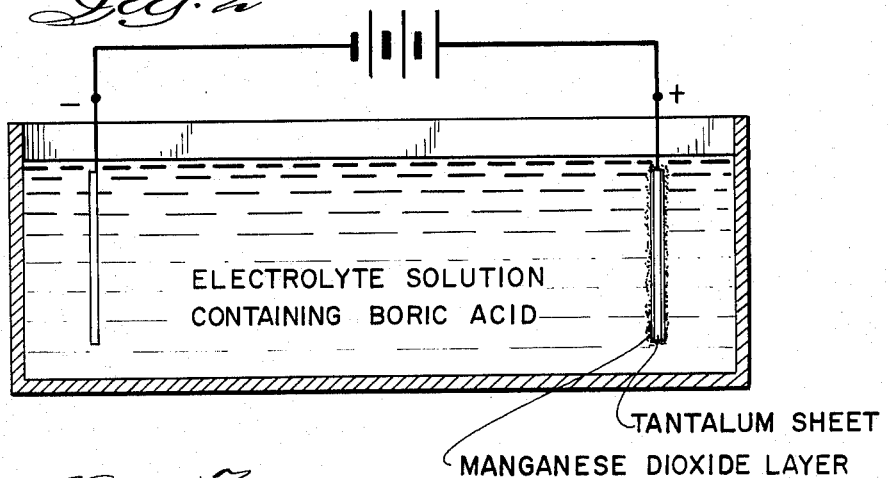
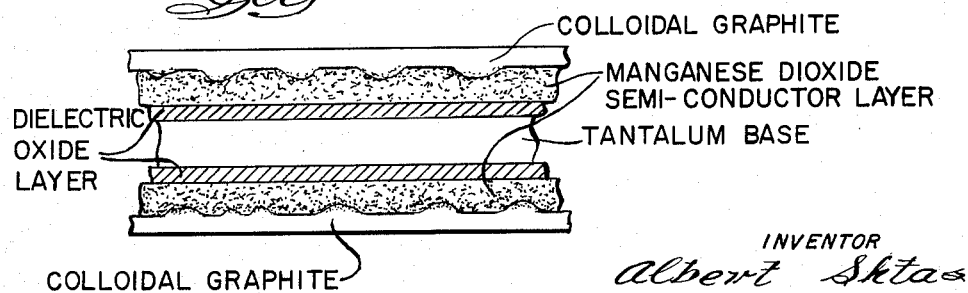
INVENTOR
Albert Shtasel
ATTORNEYS United States Patent Office 3,254,390
Patented June 7, 1966

3,254,390
METHOD OF MAKING SOLID CAPACITOR
Albert Shtasel, Chicago, Ill., assignor to Fansteel Metallurgical Corporation, a corporation of New York
Filed Apr. 3, 1961, Ser. No. 100,027
10 Claims. (Cl. 29—25.31)

This invention relates to electrolytic capacitors. More particularly, it relates to electrolytic capacitors having a solid or dry material capable of electronic conduction between the electrodes. Still more particularly, it relates to electrolytic capacitors incorporating an anodized metal electrode element having a semiconductor oxide medium adhered thereto to form a composite electrode element, and to a novel method of producing said composite element.

In accordance with the present invention, electrode elements for capacitors are prepared from various anodizable metals which can be drawn, extruded or rolled into forms such as wire, sheet, foil, and the like. Useful anodizable metals for the purpose are tantalum, columbium, aluminum, titanium, zirconium, hafnium, and the like.

Briefly, the present invention consists in adhering a layer of semiconductive oxide medium to an anodizable metal base such as a metal foil by electrodeposition of the semiconductive oxide medium from an aqueous solution when the metal base is operating as a cathode, electrically forming a dielectric film on the anodized metal base to produce a composite electrode element and joining the composite element with a cathode to produce a capacitor.

Conventional electrolytic capacitors utilize the electrical and physical properties of a dielectric barrier film of controlled thickness which is formed on the surface of an anodizable metal electrode. The wet capacitors are made up of an anode carrying the dielectric or barrier film, a liquid or paste electrolyte and a cathode, which may or may not be the enclosing container of the capacitor.

Conventional wet electrolytic capacitors have the advantage of a high capacitance per unit of volume. They also have the advantage that if the dielectric film is broken due to physical treatment or breakdown of the film due to the fact that the operating voltage has been exceeded, the passage of current at a proper forming voltage in the presence of an oxygen-supplying ionizable solution will effect at least a partial repair of the dielectric film.

Conventional wet electrolyte capacitor also have disadvantages. One disadvantage is the fact that the electrolyte present in the capacitors, most of which are aqueous solutions, present liquid leakage problems which can be cured only by intricate gasketing and sealing operations and by the use of expensive gasketing material which, in most instances, must be resistant to corrosive chemicals present in the electrolyte solution. Another disadvantage of the conventional electrolytic capacitor is that the capacitor shows marked change in capacitance with change in temperature, at least a part of which change is due to the characteristics of the aqueous electrolyte. The conventional liquid electrolyte capacitors also show a significant power loss, often called dissipation factor, due to factors such as heat losses arising by reason of the resistance of the electrolyte to the passage of current, passage of electric current due to imperfections in the dielectric oxide film, etc.

Another form of capacitor, known as the solid capacitor, is now commercially available. The solid capacitor retains most of the common characteristics of capacitors utilizing liquid electrolytes. For example, the capacitance of a solid capacitor is proportional to the dielectric constant of the barrier film and inversely proportional to the barrier film thickness. The solid capacitor has the advantage that it presents no liquid leakage problem such as is encountered in liquid electrolyte capacitors. A further advantage of the solid capacitor is that the power loss is lower than that of liquid electrolyte capacitors at low temperatures. The solid capacitors as heretofore known are disclosed in British Patent No. 747,051, entitled Solid Electrolytic Capacitors and Their Method of Manufacture.

Anode elements for the solid capacitors of the prior art have generally used as a base the conventional forms of electrode elements such as are formed by sintering compressed slugs of powdered anodizable metal. The metal units are provided with a dielectric film on the exposed surfaces thereof by a conventional electrical forming operation, for example, by immersing the unit in an oxygen-supplying ionizable solution and causing an electric current to flow between the unit which is made positive or anode, and a standard electrode.

The anodized metal electrode is provided with a solid semiconductor layer by absorbing a manganese nitrate solution thereon and heating the anode and absorbed solution to pyrolytically transform the manganese nitrate to solid manganese dioxide. The building up of a semiconductor layer of adequate thickness requires a number of impregnation steps, each followed by a pyrolytic decomposition step.

Such an electrode element is adapted for good electrical conductivity by overlaying the semiconductive layer with a conducting deposit such as a layer of colloidal carbon. This conducting deposit is generally deposited both in and on the manganese dioxide layer by an impregnation treatment. This colloidal carbon impregnated assembly in turn contacts an outer conducting layer or cathode. Suitable electrical leads secured to the outer conducting layer and to the metal anode complete the electrical connections to the capacitor.

The commercial acceptance of the solid capacitors has been limited by certain disadvantageous properties of these capacitors. A primary disadvantage of the solid capacitor has been the low maximum voltage, i.e., 35 to 50 volts, at which the capacitors can be operated. Another disadvantage of the capacitors is that the capacitors must be derated, i.e., operated at a voltage appreciably below the voltage at which the barrier or dielectric film is formed on the anode element.

Now it has been discovered that improved solid composite capacitor elements can be prepared by plating a semiconductor oxide layer from an aqueous solution on an anodizable metal base operating as a cathode and thereafter converting the semiconductor coated metal to a capacitor anode by forming a dielectric oxide film by electrical means on the electrode element. Capacitors utilizing the composite electrode elements prepared by plating or electrodeposition methods are superior to solid capacitors incorporating composite electrodes produced by pyrolytic methods because they can be operated at higher voltages, i.e., at or near the forming voltages. These new capacitors operate at voltages up to about 100 volts without derating and up to 200 volts with only slight derating.

Capacitors produced in accordance with this invention also show improved leakage characteristics with leakage currents up to the voltage of formation of the new electrodes remaining less than one microampere and dissipation factors remaining less than 5% at frequencies up to 1000 cycles.

Plated composite elements embodying the present invention exhibit a greater positive temperature coefficient of conductivity than the solid capacitors prepared by pyrolytic methods. In addition, the composite capacitor elements prepared by the electrodeposition technique of adhering a manganese dioxide layer, give reliable performance which enhances the commercial acceptance of the solid capacitors prepared therewith.

The method of preparing a composite electrode for a solid capacitor in accordance with this invention, in general, involves depositing a layer of semiconductor material on an anodizable metal base by plating or electrodeposition from a solution incorporating said semiconductor material. An anodizable metal base becomes coated with the semiconductor oxide material when it is immersed in the solution and is used as a cathode while electric current is passed between the immersed electrodes.

After deposition of the semiconductor layer, the coated metal base is anodized by placing the electrode base bearing the plated semiconductor layer in a suitable electrolyte solution which is chemically inert toward the semiconductor layer, i.e., does not dissolve the layer or remove it from the metal base, and subjecting the submerged plated element as an anode to an impressed D.C. voltage for a period necessary to develop an oxide film on said anodizable metal base. The resultant composite electrode element may be formed into a flat plate type capacitor by positioning a plate-type metal cathode in contact with the semiconductor layer or the element may be coiled or rolled, with or without a non-conducting spacer, after which the cylindrical element is provided on its outer surface with a contacting electrically conductive cathode material.

More specifically, solid electrical capacitors are manufactured in accordance with this invention by preliminarily treating a sheet of, for example, tantalum metal of predetermined size to condition the metal surface for acceptance of an adherent layer of semiconductor material. Such conditioning involves cleaning to insure the removal of grease and other foreign deposits which would interfere with uniform deposition of material from solution, and the adherence of the semiconductor material to the base. Such a cleaning operation may involve one or more treatments such as washing with solvents, impingement of a stream of steam or detergent solution on the metal surface, soaking in detergent solutions, boiling in water or in chemical solutions, for example, aqua regia, or equivalent operations.

The conditioning of the tantalum sheet may also include an etching operation. Relatively inert metals such as tantalum may be etched with hydrofluoric acid, mixtures of hydrofluoric acid and strong mineral acids, for example, nitric acid, and the like, for a period of 1 to 3 minutes. It will be recognized that metals which react with strong acids more rapidly than tantalum should remain in contact with the etching acids for a suitable shorter period of time.

The cleaned tantalum sheet is provided with an adherent semiconductor coating by electrodeposition of a metal oxide from a suitable solution wherein the metal exists in an oxidation or valence state higher than the valence state of the metal when the metal is in the oxide form. Manganese is an example of such a metal. Manganese in solution as potassium permanganate has a valence of 7 whereas in the form of manganese dioxide, it has a valence of 4. Useful solutions from which to electrodeposit oxides are solutions of acids of manganese and vanadium, water soluble salts of said acids and mixtures thereof.

Typical acidic solutions are permanganic acid solution and vanadic acid solution. Typical useful salt solutions are those containing the ammonium, alkali metal and other water soluble salts of the acids formed in solution by the metal oxides, for example, ammonium vanadate, potassium vanadate, potassium permanganate, barium permanganate, and the like.

Dilute solutions of the acids formed by certain metal oxides and of the salts thereof provide optimum conditions for deposition of adherent oxide layers. The free acid of the metallic oxide or the salts thereof are generally utilized in amounts up to about 10% by weight of the solution, with amounts of metal oxide or salts thereof in the range between about 1% and about 5% by weight of the solution preferred.

A semiconductor oxide layer plated from a solution has been found to have a different physical character from oxide layers formed by pyrolytic decomposition of manganese nitrate. A manganese oxide semiconductor layer plated from a dilute solution is probably an amorphous material since the material fails to exhibit an X-ray diffraction pattern.

Capacitors incorporating composite electrode elements utilizing manganese dioxide as the semiconductor material are preferred to capacitors incorporating electrode elements having coatings of the other metal oxides mentioned previously, when evaluated on the basis of the voltage rating, the capacity and the dissipation factor. The oxide of vanadium generally shows, for example, high resistivity as evidenced by a high dissipation factor, and therefore it is useful only for special purposes.

After an adherent semiconductor layer is deposited on the base metal, the resultant electrode element is subjected to an electrolytic forming operation to produce the barrier or dielectric layer on the anodizable metal base. Conversion of a plated metal base to an anode for a capacitor is accomplished by causing an electric current to flow between the electrode element which is made positive and a standard electrode while both electrodes are immersed in an oxygen-supplying anodizable solution known as an electrolyte. Such electrolytic forming operations may be carried out in accordance with conventional procedures provided care is exercised to insure that an oxygen-supplying ionizable solution is used which will not remove the semiconductor oxide layer from the metal base. Typical solutions which are useful for the purposes of electrolytic forming of a barrier film on an electrode element bearing a plated semiconductor oxide layer are boric acid solution, and dilute nitric acid. In electrically forming a barrier layer on an electrode element, current is passed through the ionizable solution, usually at a constant current, until the desired voltage drop is reached. Then the voltage is maintained substantially constant until the current reduces to a minimum value. This procedure is usually carried on for a period of 1 to 5 or more hours, depending upon the thickness of the oxide film desired. Oxide films of up to about 4,000 Angstrom units may be formed by impressing voltages of, for example, up to about 200 volts on the electrical system.

The above description has set forth the steps for depositing the semiconductor material and forming of a dielectric oxide layer as consecutive operations. The electrodeposition of a semiconductor material may be performed in a single step or in a multiplicity of steps. A semiconductor oxide layer may be laid down in a multiplicity of steps interspersed with electrolytic forming steps designed to produce a barrier or dielectric oxide film on the base metal.

The invention will be more fully understood from the following description with reference to the accompanying drawings in which:

FIGURE 1 diagrammatically illustrates an electrolytic apparatus wherein step 1 of the process, i.e., deposition of manganese dioxide, is carried out;

FIGURE 2 diagrammatically illustrates an electrolytic apparatus wherein step 2 of the process, i.e., formation of a dielectric oxide film, is carried out; and FIGURE 3 is a fragmentary cross-sectional view of the capacitor embodying the electrode of this invention, greatly magnified for purposes of illustration.

Referring now to FIGURE 1, there is a solid tantalum sheet positioned as the cathode in an electrolyte solution of potassium permanganate. When current is passed, an adherent porous deposit of manganese dioxide builds up on the tantalum base as shown.

Referring now to FIGURE 2, the tantalum sheet with its adherent coating of manganese dioxide is positioned as the anode in an electrical system in which the electrolyte is a solution of boric acid. When current is passed, a dielectric oxide layer is formed on the base.

Referring now to FIGURE 3, the electrode formed by the operation of steps 1 and 2 is shown adapted to be a solid capacitor by use of a coating of colloidal graphite as the outer conducting medium overlaying the manganese dioxide semiconductor layer. The inner layer in this instance is the tantalum base, the cross hatch material is the dielectric oxide layer. The next layer which actually has points of contact with the tantalum base is the manganese dioxide semiconductor layer and the external layer is the colloidal graphite which penetrates the semiconductor manganese dioxide layer.

In a preferred method for the production of an electrode element, the electrodeposition of semiconductor oxide material is carried out in two or more steps with an anodizing step prior to and an anodizing step after the second electrodeposition step. Completion of the deposition of semiconductor oxide material in a finishing electrodeposition operation after all electrolytic forming operations are complete, thickens the coating of the semiconductor oxide.

After a composite electrode element is complete, it may be subjected to heat treatment to reduce the resistivity and to lower the dissipation factor. Heating of the composite assembly to a temperature range of up to about 200° C. is usually sufficient to accomplish these results.

Composite elements consisting of a metal base carrying a dielectric oxide layer and an adhered semiconductor oxide layer are brought into contact with a cathode member to produce a capacitor. Reliability of the capacitor is enhanced by impregnating the semiconductor oxide layer of the composite assembly with a solid conducting material, as by immersing the assembly in an aqueous suspension of graphite and then air drying or heating the impregnated assembly to drive off the aqueous medium. The impregnation step lowers the resistivity of the semiconductor layer and reduces the dissipation factor. A composite assembly impregnated with graphite is brought into contact with a conducting metal cathode to form a capacitor. A cathode may take various forms and shapes varying from a simple conducting metal plate, a layer formed by spraying the graphite-impregnated assembly with molten metal, by melting onto the graphite-impregnated assembly a low melting point solder or by painting the exterior of the impregnated assembly with a metallic paint. Following completion of the outer metallic layer, suitable leads may be attached to the base metal material and to the exterior coating or casing. The anode lead must, of course, be electrically insulated from the exterior casing.

Solid tantalum capacitors of this invention made by the process of electrode deposition of manganese dioxide from a potassium permanganate solution can be rated at 125 volts with leakage currents of less than one microampere and dissipation factors of less than 5% at frequencies up to 1000 cycles.

The invention will be more fully understood from the following examples which are given by way of illustration and without any intention that the invention be limited thereto. Obviously, other techniques for preparing assemblies and of assembling capacitors having an electrode element of the type hereinbefore described, can be employed, depending upon the exigencies of the situation.

*Example I*

A tantalum metal foil with an area of 1 square inch and a thickness of 0.005 inch is cleaned and degreased by boiling in carbon tetrachloride. The boiled metal foil is rinsed in acetone and then rinsed in distilled water.

The degreased tantalum foil is etched by immersion for 1 minute in an aqueous solution maintained at room temperature and containing nitric acid and hydrofluoric acid in a 1:1 volume ratio. The etched foil is rinsed first in tap water and then in distilled water.

Upon completion of the etching operation, the tantalum foil is immersed in an aqueous solution containing 2% by weight of potassium permanganate and 2% by weight of sulphuric acid maintained at a temperature of about 90° C. The tantalum foil is connected in an electrical system wherein the tantalum foil is cathode and a platinum element is the anode. 5 milliamperes per square inch of current is passed through the solution for 30 minutes. Passage of current results in the deposition of a manganese dioxide layer on the tantalum foil. Upon completion of this electrodeposition of manganese dioxide, the foil is removed from the plating bath and is rinsed in cold distilled water.

A barrier or dielectric layer necessary to the use of the foil as a capacitor anode is developed by electrolytic forming. The manganese dioxide coated tantalum foil is introduced into an aqueous solution bath containing 10% by weight of boric acid.

This aqueous solution is held at a temperature of 90° C. Current is passed through the solution at a constant rate of about 5 milliamperes per square inch, using the tantalum foil as the anode, until a potential difference of 150 volts is achieved. From this point on, the voltage of the circuit is held constant for about an hour, after which the anodized element is washed free of electrolyte.

Following anodizing, the composite element is returned to the electrodeposition bath where additional manganese dioxide is deposited on the manganese dioxide-bearing anodized tantalum foil. The second electrodeposition operation is carried out in the same manner as is described for the first electrodeposition operation, except that current is passed through the solution for a period of 2 hours at a constant rate of approximately 15 milliamperes to complete the deposition of an adherent manganese dioxide layer on the composite element. The composite element is rinsed in distilled water and dried.

The dried composite electrode element is impregnated with conducting material by immersion in a solution of colloidal carbon (Aquadag).

Following impregnation with colloidal carbon or graphite, the composite element is provided with a coating of silver paint. Suitable leads are attached to the solid tantalum foil and to the external silver paint layer. Then the unit is heated to 100° C.

The capacitor thus formed may be suitably finished by coating the surface with a lacquer or by enclosure in a metal case. A typical tantalum capacitor formed from a ¼ inch square tantalum foil shows the following characteristics: a capacitance of 0.6 microfarad per square inch, a dissipation factor of 3% at room temperature, a leakage current at room temperature and at 100 volts of 0.5 microampere per microfarad, and a leakage current at 100° C. and at 45 volts of 0.2 microampere per microfarad.

Heating the finished capacitor to a temperature of 100° C. after attachment of leads effectively dries the unit and markedly reduces the dissipation factor.

*Example II*

A tantalum metal foil with an area of 1 square inch and a thickness of 0.0005 inch is cleaned and degreased by boiling in carbon tetrachloride. The boiled metal foil is rinsed in acetone and then rinsed in distilled water.

The degreased tantalum foil is etched by immersion for 1 minute in an aqueous solution maintained at room temperature and containing nitric acid and hydrofluoric acid in a 1:1 volume ratio. The etched foil is rinsed first in tap water and then in distilled water.

Upon completion of the etching operation, the tantalum foil is immersed in an aqueous solution containing 2% by weight of potassium permanganate and 2% by weight of sulphuric acid maintained at a temperature of about 50° C. The tantalum foil is connected in an electrical system wherein the tantalum foil is cathode and a platinum element is the anode. 2 milliamperes per square inch of current is passed through the solution for 30 minutes. Passage of current results in the deposition of a manganese dioxide layer on the tantalum foil. Upon completion of this electrodeposition of manganese dioxide, the foil is removed from the plating bath and is rinsed in cold distilled water.

A barrier or dielectric layer necessary to the use of the foil as a capacitor anode is developed by electrolytic forming. The manganese dioxide coated tantalum foil is introduced into an aqueous solution bath containing 10% by weight of boric acid.

This aqueous solution is held at a temperature of 90° C. Current is passed through the solution at a constant rate of about 5 milliamperes per square inch, using the tantalum foil as the anode, until a potential difference of 200 volts is achieved. From this point on, the voltage of the circuit is held constant for about 5 hours, after which the anodized element is washed free of electrolyte.

The dried composite electrode element is impregnated with conducting material by immersion in a solution of colloidal carbon (Aquadag).

Following impregnation with colloidal carbon or graphite, the composite element is provided with a coating of silver paint. Suitable leads are attached to the solid tantalum foil and to the external silver paint layer. Then the unit is heated to 100° C.

The capacitor thus formed may be suitably finished by coating the surface with a lacquer or by enclosure in a metal case. A typical tantalum capacitor formed from a ¼ inch square tantalum foil shows the following characteristics: a capacitance of 0.4 microfarad per square inch, a dissipation factor at −55° C., at room temperature and at 85° C. of 15%, 2% and 3%, respectively, a leakage current at room temperature and at 100 volts of 0.6 microampere per microfarad, a leakage current at room temperature and at 150 volts of 0.6 microampere per microfarad, a leakage current at −55° C. and at 60 volts of substantially zero and a leakage current at 85° C. and at 60 volts of 0.025 microampere per microfarad.

*Example III*

An aluminum metal foil with an area of 1 square inch and a thickness of 0.003 inch is cleaned and degreased by boiling in carbon tetrachloride. The boiled metal foil is rinsed in acetone and then rinsed in distilled water.

The degreased aluminum foil is etched by immersion for 1 minute in an aqueous solution maintained at room temperature and containing nitric acid and hydrofluoric acid in a 1:1 volume ratio. The etched foil is rinsed first in tap water and then in distilled water.

Upon completion of the etching operation, the aluminum foil is immersed in an aqueous solution containing 2% by weight of potassium permanganate and 2% by weight of sulphuric acid maintained at a temperature of about 50° C. The aluminum foil is connected in an electrical system wherein the aluminum foil is cathode and a platinum element is the anode. 5 milliamperes per square inch of current is passed through the solution for 30 minutes. Passage of current results in the deposition of a manganese dioxide layer on the aluminum foil. Upon completion of this electrodeposition of manganese dioxide, the foil is removed from the plating bath and is rinsed in cold distilled water.

A barrier or dielectric layer necessary to the use of the foil as a capacitor anode is developed by electrolytic forming. The manganese dioxide coated aluminum foil is introduced into an aqueous solution bath containing 10% by weight of boric acid.

This aqueous solution is held at a temperature of 90° C. Current is passed through the solution at a constant rate of about 5 milliamperes per square inch, using the aluminum foil as the anode, until a potential difference of 200 volts is achieved. From this point on, the voltage of the circuit is held constant for about 2 hours, after which the anodized element is washed free of electrolyte.

The dried composite electrode element is impregnated with conducting material by immersion in a solution of colloidal carbon (Aquadag).

Following impregnation with colloidal carbon or graphite, the composite element is provided with a coating of silver paint. Suitable leads are attached to the solid aluminum foil and to the external silver paint layer. Then the unit is heated to 100° C.

The capacitor thus formed may be suitably finished by coating the surface with a lacquer or by enclosure in a metal case.

A typical aluminum capacitor formed from a ¼ inch square aluminum foil shows a dissipation factor of 2 to 3 times that of a tantalum capacitor formed from tantalum foil of the same size and a current leakage of approximately the same magnitude as the tantalum capacitor. The capacitor is capable of operating at voltages up to about 100 volts without derating and at voltages in the range between 100 volts and about 200 volts with progressive derating.

Aluminum base composite electrode elements produced by the method of this invention can be formed to higher voltages than can be utilized for the formation of dielectric film on the tantalum base elements.

Capacitors assembled with aluminum base elements produced by the method of this invention differ from the corresponding capacitors produced from tantalum elements in certain properties. For example, capacitors having an aluminum base electrode of this invention as anode, in general, can be operated at higher voltages, exhibit a higher equivalent series resistance, show a slightly lower capacitance per unit of area and show a greater change in capacitance with temperature and frequency than the capacitors utilizing the corresponding tantalum elements as anode.

Solid capacitors having an aluminum base element as anode show marked improvement in leakage current characteristics over wet electrolytic capacitors of substantially the same capacity. In general, a wet capacitor shows leakage current of 150, 200 and 800 microamperes, at the working voltages of 100, 150 and 200 volts, respectively. Comparable solid capacitors having an aluminum base element as anode show a leakage current of less than 1 microampere, about 1 microampere and about 2 microamperes at the respective working voltage above set forth.

The foregoing detailed description is given for clearness of understanding only and no unnecessary limitations should be understood therefrom, for some modifications will be obvious to those skilled in the art.

I claim:

1. A method of preparing a composite electrode element which comprises plating a layer of semiconductor oxide material from a solution incorporating said semiconductor oxide material on an anodizable metal base acting as a cathode, said oxide being that of a metal which is stable in solution in a valence state higher than the valence state of the metal when it is in the oxide form, submerging the plated base in an oxygen-supplying ionizable solution which is chemically inert toward said semiconductor oxide material, subjecting the submerged plated base as an anode of an electrical circuit to an impressed D.C. voltage for a period necessary to develop an oxide film on said base.

2. A method of preparing a composite electrode element which comprises plating a layer of semiconductor oxide material from a solution incorporating said semiconductor oxide material onto an anodizable metal base acting as a cathode, said oxide being that of a metal which is stable in solution in a valence state higher than the valence state of the metal when it is an oxide form, submerging the plated base in an oxygen-supplying ionizable solution which is chemically inert toward said semiconductor material, subjecting the submerged plated base as an anode of an electrical circuit to an impressed D.C. voltage for a period necessary to develop an oxide film on said base, impregnating the semiconductor layer with a liquid suspension of conducting particles, and evaporating the liquid in which said conducting particles are suspended so that the conducting particles form a coherent conducting covering layer.

3. A method of preparing a composite electrode element which comprises plating a layer of an oxide of manganese on an anodizable metal base from a solution containing permanganate ions, submerging the plated base in an oxygen-supplying ionizable solution which is chemically inert toward said manganese oxide, subjecting the submerged plated element as an anode of an electrical circuit to an impressed D.C. voltage for a period necessary to develop an oxide film on said metal element, impregnating the manganese oxide layer with a liquid suspension of colloidal carbon, and evaporating the liquid in which the carbon particles are suspended so that the carbon particles form a coherent conducting covering layer.

4. A method of preparing a composite electrode element for a solid capacitor according to claim 3, in which the anodizable metal base is tantalum.

5. The method of preparing a composite electrode element for a solid capacitor according to claim 4, in which the anodizable metal base is aluminum.

6. A method of preparing a solid capacitor which comprises submerging an anodizable metal base in a solution incorporating a semiconductor oxide material, subjecting the submerged base as a cathode to passage of electrical current for a period necessary to plate a semiconductor oxide layer on said base, said semiconductor oxide layer being an oxide of a metal which is stable in solution in a valence state higher than the valence state of the metal when it is in the solid oxide form, submerging the plated base in an oxygen-supplying ionizable solution which is chemically inert toward said semiconductor oxide material, subjecting the submerged plated base as an anode of an electrical circuit to an impressed D.C. voltage for a period necessary to develop an oxide film on said base, impregnating the semiconductor layer with a liquid suspension of conducting particles, evaporating the liquid in which said conducting particles are suspended so that the conducting particles form a coherent conducting covering layer, and coating the exterior of said plated base with a metallic covering which is insulated from said metal base.

7. A method of preparing a solid capacitor which comprises submerging a tantalum metal base in a solution incorporating a semiconductor oxide material, subjecting the submerged base as a cathode to passage of electrical current for a period necessary to plate a semiconductor oxide layer on said base, said semiconductor oxide layer being an oxide of a metal which is stable in solution in a valence state higher than the valence state of the metal when it is in the solid oxide form, submerging the plated base in a boric acid solution, subjecting the submerged plated base as an anode of an electrical circuit to an impressed D.C. voltage for a period necessary to develop an oxide film on said base, and coating the exterior of said plated layer with a metallic covering which is insulated from said metal base.

8. A method of preparing a solid capacitor which comprises submerging an anodizable metal base in a solution incorporating a semiconductor oxide material, subjecting the submerged base as a cathode to passage of electrical current for a period necessary to plate a semiconductor oxide layer on said base, said semiconductor oxide layer being an oxide of a metal which is stable in solution in a valence state higher than the valence state of the metal when it is in the solid oxide form, submerging the plated base in an oxygen-supplying ionizable solution which is chemically inert toward said semiconductor oxide material, subjecting the submerged plated base as an anode of an electrical circuit to an impressed D.C. voltage for a period necessary to develop an oxide film on said base, impregnating the semiconductor layer with a liquid suspension of conducting particles, evaporating the liquid in which said conducting particles are suspended so that the conducting particles form a coherent conducting covering layer, and coating the exterior of said plated element with a silver paint which is insulated from said base and is of sufficient thickness to permit securing of an electrical lead thereto.

9. A method of preparing a solid capacitor which comprises submerging an anodizable metal base in a solution containing between about 2% and about 5% by weight of a compound incorporating a semiconductor metal oxide, subjecting the base as a cathode to passage of electrical current for a period necessary to plate a semiconductor oxide layer on said base, said semiconductor oxide layer being an oxide of a metal which is stable in solution in a valence state higher than the valence state of the metal when it is in the solid oxide form, submerging the plated base in an oxygen-supplying ionizable solution which is chemically inert toward said semiconductor oxide layer, subjecting the submerged plated base as an anode of an electrical circuit to an impressed D.C. voltage for a period necessary to develop an oxide film on said base, and coating the exterior of said plated layer with a metallic covering which is insulated from said metal base.

10. A method of preparing a solid capacitor comprising submerging an anodizable tantalum sheet in a solution containing about 2% by weight of potassium permanganate, subjecting the submerged sheet as a cathode to passage of electrical current to develop a coating of manganese oxide thereon, submerging the manganese oxide coated tantalum sheet in a boric acid solution, subjecting the submerged coated tantalum sheet as an anode of an electrical circuit to an impressed D.C. voltage of up to 200 volts for a period necessary to develop an oxide film on said tantalum sheet, submerging the manganese oxide coated and anodized sheet in said solution containing 2% by weight of potassium permanganate, subjecting the submerged coated and anodized sheet as a cathode of an electrical circuit to an impressed D.C. voltage to deposit additional manganese oxide, impregnating the semiconductor layer with a liquid suspension of conducting particles, evaporating the liquid in which said conducting particles are suspended so that the conducting particles form a coherent conducting covering layer, and coating the exterior of said plated base with a metallic covering which is insulated from said metal base.

References Cited by the Examiner

UNITED STATES PATENTS

| | | | |
|---|---|---|---|
| 1,706,951 | 3/1929 | Benner | 317—233 |
| 1,906,691 | 5/1933 | Lilienfeld | 317—233 X |
| 2,052,575 | 9/1936 | Lilienfeld | 317—230 |
| 2,936,514 | 5/1960 | Millard | 317—230 |
| 3,066,247 | 10/1962 | Robinson | 317—230 |

FOREIGN PATENTS 747,051   3/1956   Great Britain.

JOHN W. HUCKERT, *Primary Examiner.*
J. D. KALLAM, *Assistant Examiner.*